United States Patent
Gordon

(10) Patent No.: US 9,452,887 B2
(45) Date of Patent: Sep. 27, 2016

(54) MONORAIL CONVEYOR BELT ADVANCE AND STRUCTURE INSTALLATION SYSTEM FOR UNDERGROUND MINING

(71) Applicant: Gordon Gordon, Wheeling, WV (US)

(72) Inventor: Gordon Gordon, Wheeling, WV (US)

( * ) Notice: Subject to any disclaimer, the term of this patent is extended or adjusted under 35 U.S.C. 154(b) by 0 days.

(21) Appl. No.: 14/678,500

(22) Filed: Apr. 3, 2015

(65) Prior Publication Data
US 2016/0009496 A1     Jan. 14, 2016

Related U.S. Application Data

(60) Provisional application No. 62/061,543, filed on Oct. 8, 2014, provisional application No. 61/979,379, filed on Apr. 14, 2014.

(51) Int. Cl.
| | |
|---|---|
| *B65G 21/14* | (2006.01) |
| *B65G 15/08* | (2006.01) |
| *B65G 21/02* | (2006.01) |
| *B65G 15/62* | (2006.01) |

(52) U.S. Cl.
CPC ............... *B65G 15/08* (2013.01); *B65G 15/62* (2013.01); *B65G 21/02* (2013.01)

(58) Field of Classification Search
CPC ...... B65G 15/08; B65G 21/14; B65G 21/10; B65G 21/12; B65G 41/008
USPC .......................... 198/300, 312, 313, 588, 812
See application file for complete search history.

(56) References Cited

U.S. PATENT DOCUMENTS

| | | | | |
|---|---|---|---|---|
| 3,920,115 A | * | 11/1975 | Craggs ................... | B65G 41/02 198/812 |
| 4,339,031 A | * | 7/1982 | Densmore ............... | B61B 13/10 198/830 |
| 4,784,257 A | * | 11/1988 | Doerr ..................... | B65G 21/16 198/303 |
| 4,860,878 A | * | 8/1989 | Mraz ...................... | B65G 21/14 198/309 |
| 4,896,764 A | * | 1/1990 | Neunzert ................ | B65G 41/02 198/594 |
| 5,938,004 A | * | 8/1999 | Roberts .................. | B65G 21/14 198/594 |
| 6,095,320 A | * | 8/2000 | DeMong ................. | B65G 15/00 198/812 |
| 6,758,326 B1 | * | 7/2004 | Benjamin ............... | B65G 21/14 198/594 |
| 7,926,640 B2 | * | 4/2011 | Fuchs ..................... | E21F 13/02 198/313 |

* cited by examiner

*Primary Examiner* — James R Bidwell
(74) *Attorney, Agent, or Firm* — Pryor Cashman LLP

(57) ABSTRACT

The present invention provides a method of installing a conveyor belt in an underground mine comprising the steps of installing a monorail in the mine, mounting at least two conveyor belt cradles on the monorail, coupling at least two of the conveyor belt cradles by a chain of predetermined length, coupling a conveyor belt to the conveyor belt cradles, coupling at least one conveyor belt cradle to an end roller, and moving the end roller to a predetermined point in the mine, wherein the moving the end roller pulls the conveyor belt cradles apart by the predetermined length, positioning the cradles in a desired location in the mine.

14 Claims, 4 Drawing Sheets

MONORAIL CONVEYOR BELT ADVANCE AND STRUCTURE INSTALLATION SYSTEM FOR UNDERGROUND MINING

RELATED APPLICATIONS

This application claims priority to U.S. Provisional Patent Application Nos. 61/979,379, filed Apr. 14, 2014, and 62/061,543, filed Oct. 8, 2014, the disclosures and teachings of which are incorporated herein by reference.

FIELD OF THE INVENTION

The present invention relates generally to a system and method for transporting coal and other materials in a coal mine. The invention provides a series of metal frames compressed together which are separated to create a networked structure inside of the mine.

BACKGROUND

Coal is a major energy source used widely around the world. While there are several methods for mining coal, longwall mining is among the most popular. Longwall coal mining involves a cutting head that moves back and forth across a panel of coal that can be hundreds of feet wide and over a mile deep. The coal cut from the panel falls onto a conveyor belt, where it is removed from the mine. While the conveyor belts greatly ease the difficulty of transporting coal, installing the structure of the belt is a time consuming process that inevitably delays the coal mining process. The invented system reduces the time required to install the conveyor belt system by providing a prefabricated support frame system that is installed in one motion. At the time of mining, the invented prefabricated system simply needs to be expanded and secured in place. Also, because the support frames are connected and installed together, the invented system easily centers itself. These advantages result in reducing the time required to install the conveyor belt system by up to seventy-five percent, leaving more time in a shift for mining and increasing productivity,

DESCRIPTION OF PRIOR ART

To the Applicant's knowledge, no prior art exists that provides a prefabricated, compressed conveyor belt structure for the use of decreasing time required to mine resources. Thus, is advantageous to provide a system and method with such features.

BRIEF SUMMARY

The present invention provides a method of installing a conveyor belt in an underground mine comprising the steps of installing a monorail in the mine, mounting at least two conveyor belt cradles on said monorail, coupling at least two of the conveyor belt cradles by a chain of predetermined length, coupling a conveyor belt to said conveyor belt cradles, coupling at least one conveyor belt cradle to an end roller, and moving the end roller to a predetermined point in the mine, wherein said moving the end roller pulls the conveyor belt cradles apart by the predetermined length, positioning the cradles in a desired location in the mine.

DETAILED DESCRIPTION OF THE DRAWINGS AND THE PREFERRED EMBODIMENT

Figure 1:
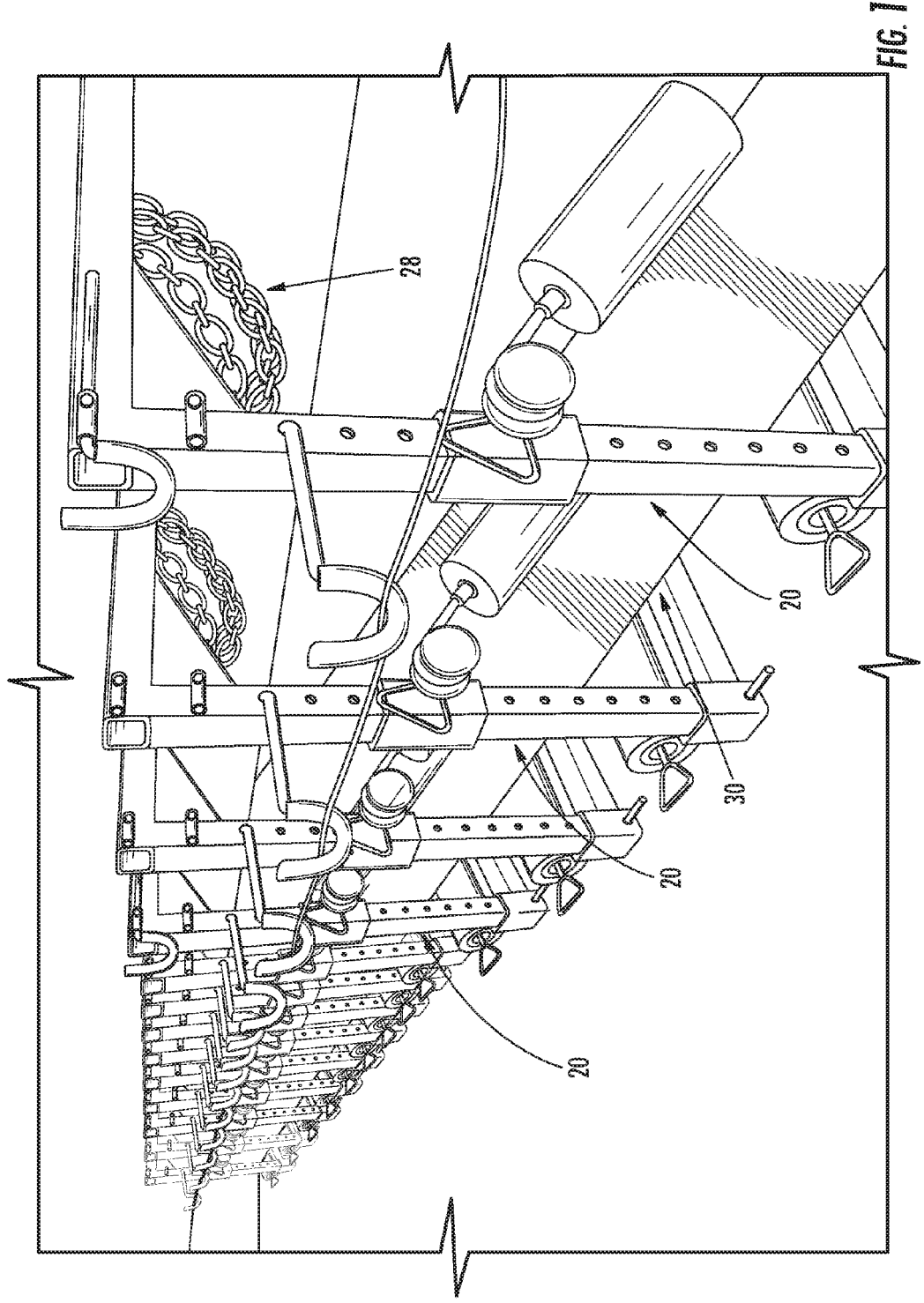
FIG. 1 is a depiction of the preferred embodiment of the invention in use in a mine, showing the network of cradles, conveyor belt rollers, conveyor belt, and monorail.

Description will now be given of the invention with reference to the attached FIGS. 1-3. It should be understood that these figures are exemplary in nature and in no way serve to limit the scope of the invention, as the invention will be defined by the claims, as interpreted by the Courts in an issued U.S. Patent.

The invention is a monorail system for installing a conveyor belt structure in an underground mine. As can be seen in FIG. 1, the invention installs a series of supports or cradles 20 through which the conveyor belt 30 cycles.

Figure 2:
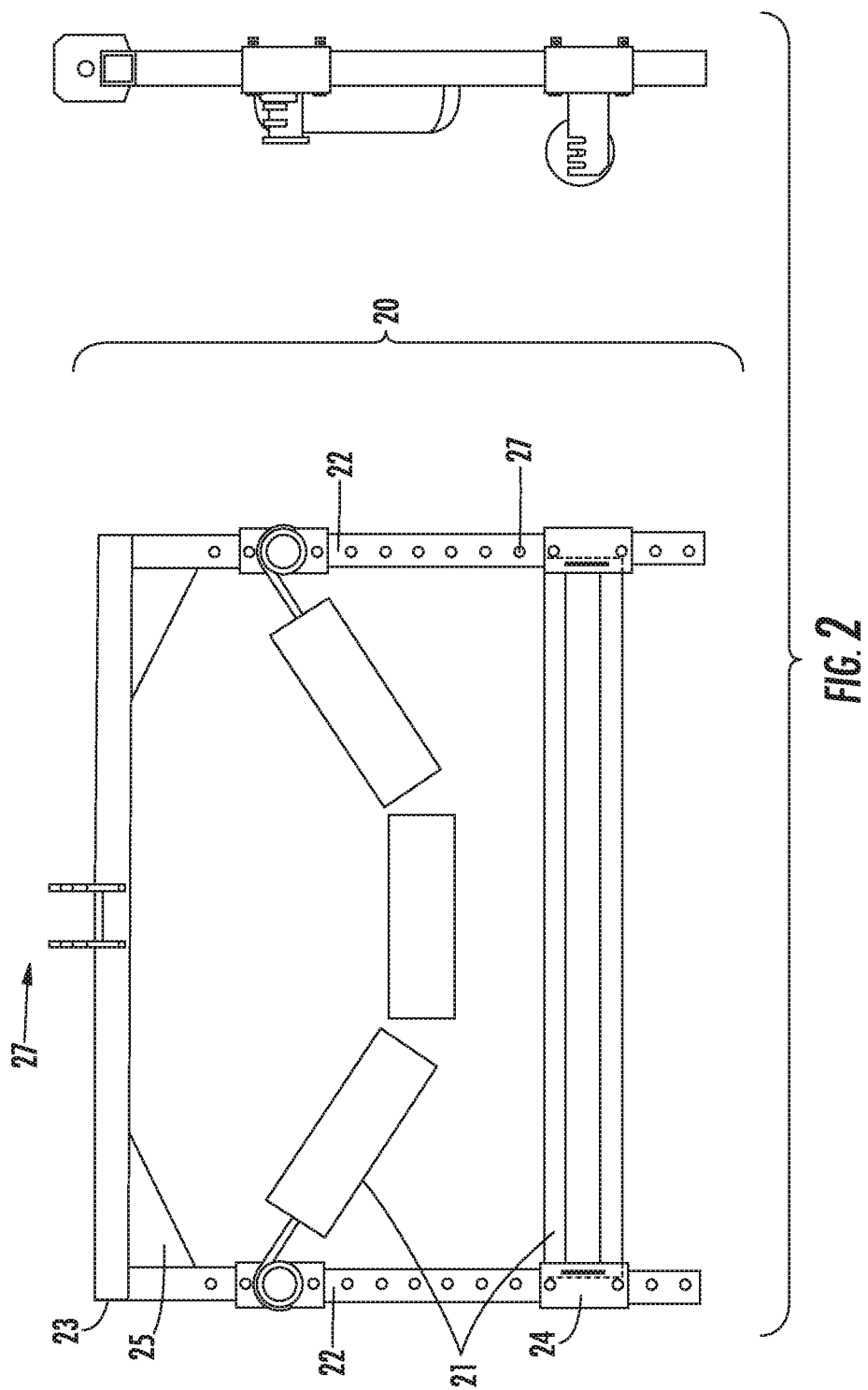
FIG. 2 is front perspective view of a single cradle, showing the preferred components and measurements.
Figure 3:
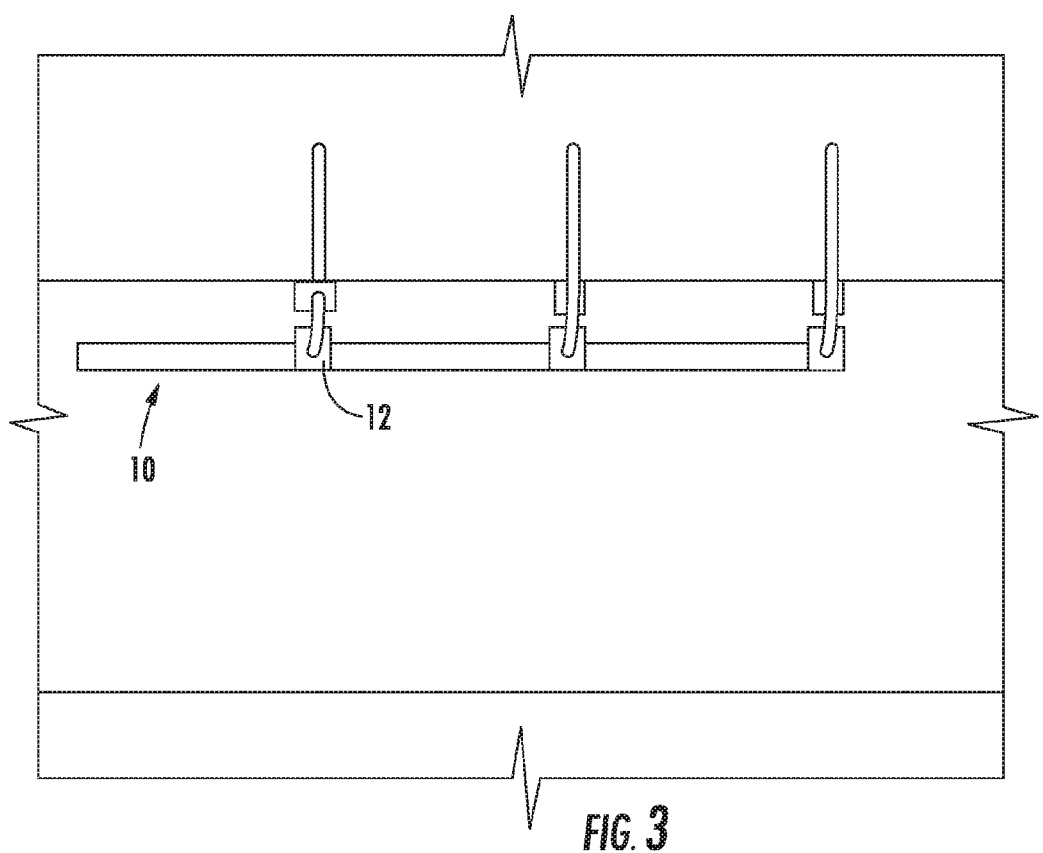
FIG. 3 is a side view of a mine illustrating the monorail installed in the ceiling of the mine.

As seen in FIG. 2, the cradles 20 are generally rectangular frames that support conveyor belt rollers 21. The conveyor belt 30 is then positioned on the conveyor belt rollers 21. The cradles can be made of any metal known to support structures, although steel is preferred. The cradles 20 vary in size depending on the amount of coal the belt carries and the size of the belt. In the embodiment represented by the figures, the frame is roughly fifty-one inches high and about sixty-two inches wide, as shown in FIG. 2. The cradle is made up of two parallel and vertical supports 22 joined to a first horizontal support at their top and a second horizontal support at a lower position. In preferred embodiments of the invention, the vertical supports will have fifteen holes 27 placed vertically at three inches apart, leaving a spare seven and one-half inches at the top of each support without holes. The second, lower horizontal support will hold the roller or rollers 21 on which the conveyor belt 30 lies and therefore should be positioned at a height that corresponds to the desired height of the belt 30. Both horizontal supports are preferably made of wall tubing. Additional rollers can also be placed between the horizontal supports to accommodate multiple conveyor belts. Reinforcing bars or plates 25 may be installed in the corners of the frame where possible and are preferably positioned to meet the horizontal supports 23 at twelve inches from each edge. Extending leveling legs can be built onto the vertical supports to provide a structure on which the frame can stand. The leveling legs are preferably steel supports similar in form to the vertical supports 22 and attached vertically to the vertical supports 22 by pins inserted into the holes 27. At the bottom of the leveling legs are preferably triangular forms on which the legs can rest on the mine floor. A user can lower the legs to secure a cradle by removing the pins in a hole 27 and repositioning the pins in a lower hole. When the cradle is to be removed, the pins can be removed again, raised, and then placed into their original position away from the floor. At the center of the top horizontal support is a hanger roughly four and one half inches wide and having at least one wheel or other mechanism for moving the cradle along the monorail 10. The conveyor belt 30 should be a rubber belt installed on the cradles 20 prior to expanding the invention by feeding a suspended roll of belt onto a roller. As the system expands, the roll of belt will unroll additional belt onto the system. Sections of the conveyor belt may be attached to accommodate longer systems.

The monorail 10, or track, is preferably a six inch wide I-beam with hangers 12 on its top surface. The monorail 10 is installed at the roof of the mine as seen in FIG. 3 preferably by hanging the hangers of the rail to ceiling hangers bolted into stone or structure in the mine's ceiling. A series of cradles 20 are mounted front to back on the track. The cradles are each connected by a metal chain 28 preferably positioned at or near the hanger 27. The chain 28 is installed so that the amount of chain between each cradle is equal to the distance desired between each cradle when the invention is in the expanded state. This distance will depend on the weight of the coal removed. In the preferred embodiment, the chain can hold roughly six hundred tons per foot and as a result of the amount of coal being moved, there are eleven feet between each cradle. As a result, the preferred embodiment uses twenty-nine cradles to cover a two hundred and seventy-five foot mine.

To use the invention, a end roller possibly integrated with a moving mechanism, such as a tram, feeder/crusher 44, or tail piece, is attached to the front of the network of cradles. When an operator is ready to install the invention, the end roller coupled to the moving mechanism moves forward, pulling the cradles 20 along with it. This movement separates the cradles 20 to the point allowed by their connecting chain 28. Finally, the network of cradles ends at the required point, leaving a system of supports in place for the conveyor belt beneath the monorail track. In the preferred embodiments that include leveling legs, an operator will at this point return to each cradle and lower and secure the leveling legs. The belt may then begin rotating and transporting materials as desired.

Figure 4:
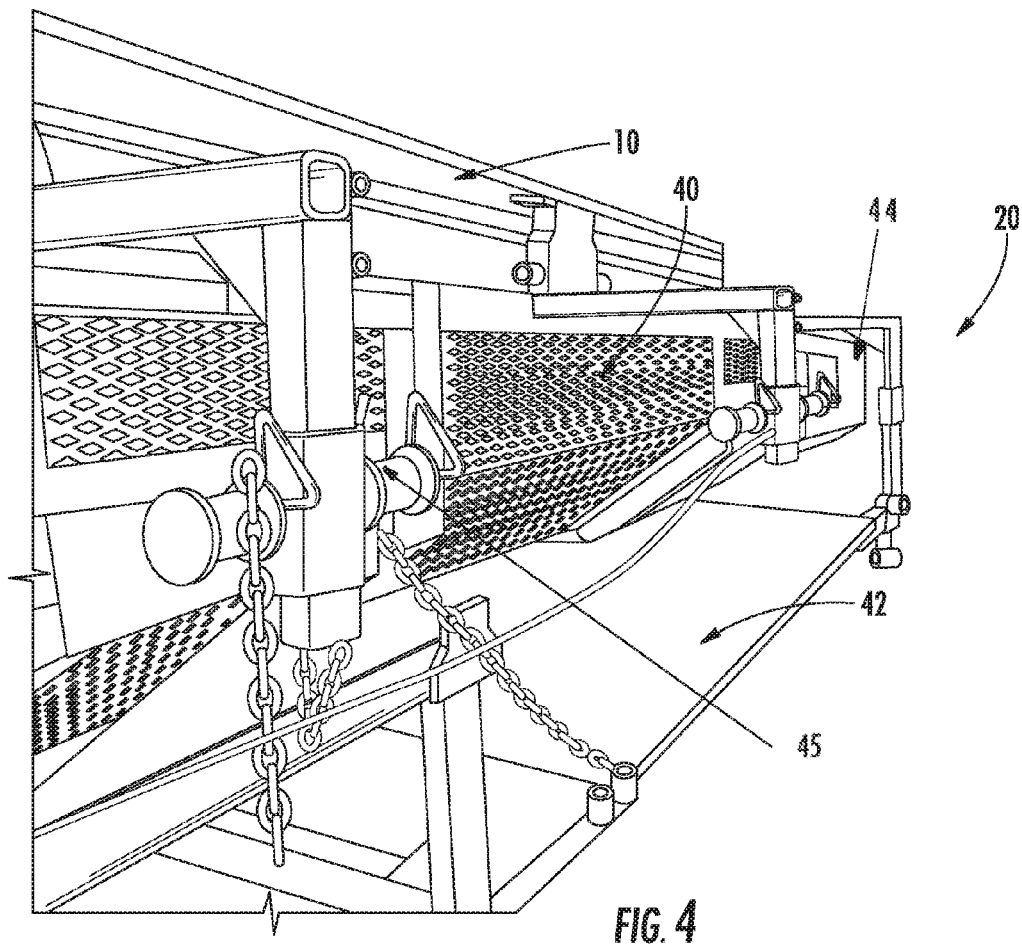
FIG. 4 is a depiction of preferred method of safely installing the structure and collapse of the system on a running conveyor after the advance of the belt

It is preferred that the structure of the system is built around the running belt. Yet, because the belt runs at high speeds, roughly six hundred feet per minute in the example embodiment depicted in the Figures, this approach can be dangerous. To prevent the risk of harm, the preferred embodiments include a mechanism for containing the belt at the building site, as depicted in FIG. 4. The preferred embodiment includes a metal net housing 40 over the top section of the conveyor belt that spans the distance of the building site. Above the bottom section of the conveyor belt, the return belt, is a protective plate 42 preferably made of aluminum. The cradles 20 may then be built around the running belt without the danger of contact with the belt. At this point, the several supports 22, 23 are attached and mounted on the monorail 10. The rollers 21 may then be added. Each cradle 20 is connected to a cable (not shown) that is further connected to a hydraulic winch 45. When each cradle is completed, the hydraulic winch pulls the cradle 20 forward to the other cradles 20 and into the invention's compressed position. The cradles 20 may then be positioned in the mine using the method described above.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

The invention claimed is:

1. A method of installing a conveyor belt in an underground mine having a floor comprising:
   installing a monorail in the mine;
   mounting at least two conveyor belt cradles on said monorail, each conveyor belt cradle having leveling legs capable of contacting the floor of them mine;
   coupling at least two of the conveyor belt cradles by a chain of predetermined length;
   coupling a conveyor belt to said conveyor belt cradles;
   coupling at least one conveyor belt cradle to an end roller;
   moving the end roller to a predetermined point in the mine;
   leveling said conveyor belt cradles by adjusting the leveling legs to contact the floor of the mine;
   wherein said moving the end roller pulls the conveyor belt cradles apart by the predetermined length, positioning the cradles in a desired location in the mine; and
   wherein the said end roller is coupled to a moving mechanism.

2. A method as claimed in claim 1 wherein said monorail is installed on the ceiling of the mine.

3. A method as claimed in claim 1 wherein the said end roller is coupled to a tail piece.

4. A method as claimed in claim 1 wherein the conveyor belt cradles include holes and pins for positioning the conveyor belt roller.

5. A method as claimed in claim 1 further comprising mounting additional conveyor belt cradles while the conveyor belt is operating.

6. A method as claimed in claim 5 further comprising mounting a mechanism for protecting the conveyor belt at the mounting site of the additional conveyor belt cradles.

7. A method as claimed in claim 5 further comprising pulling said additional conveyor belt cradles forward by a hydraulic winch.

8. A system of installing a conveyor belt in an underground mine having a floor comprising:
   a monorail:
   a conveyor belt;
   at least two conveyor belt cradles mounted on the monorail each having at least one conveyor belt roller that supports the conveyor belt and each including leveling legs capable of contacting the floor of the mine; and
   an end roller;
   a chain of a predetermined length that couples at least two of the cradles;
   a chain that couples at least one cradle to an end roller;
   wherein said end roller pulls the at least one cradle and by doing so separates the said cradles by the predetermined length, positioning them in the mine; and
   wherein said end roller is coupled to a moving mechanism.

9. A system as claimed in claim 8 wherein said monorail is fixed to the ceiling of the mine.

10. A system as claimed in claim 8 wherein the said end roller is coupled to a tail piece.

11. A system as claimed in claim 8 wherein the conveyor belt cradles include holes and pins for positioning the conveyor belt roller.

12. A system as claimed in claim 8 further comprising additional conveyor belt cradles mounted to the system while the conveyor belt is operating.

13. A system claimed in claim 12 further comprising a mechanism for protecting the conveying belt at the mounting site of the additional conveyor belt cradles.

14. A method as claimed in claim 12 further comprising a hydraulic winch which pulls said additional conveyor belt cradles forward.

* * * * *